Figure 1:
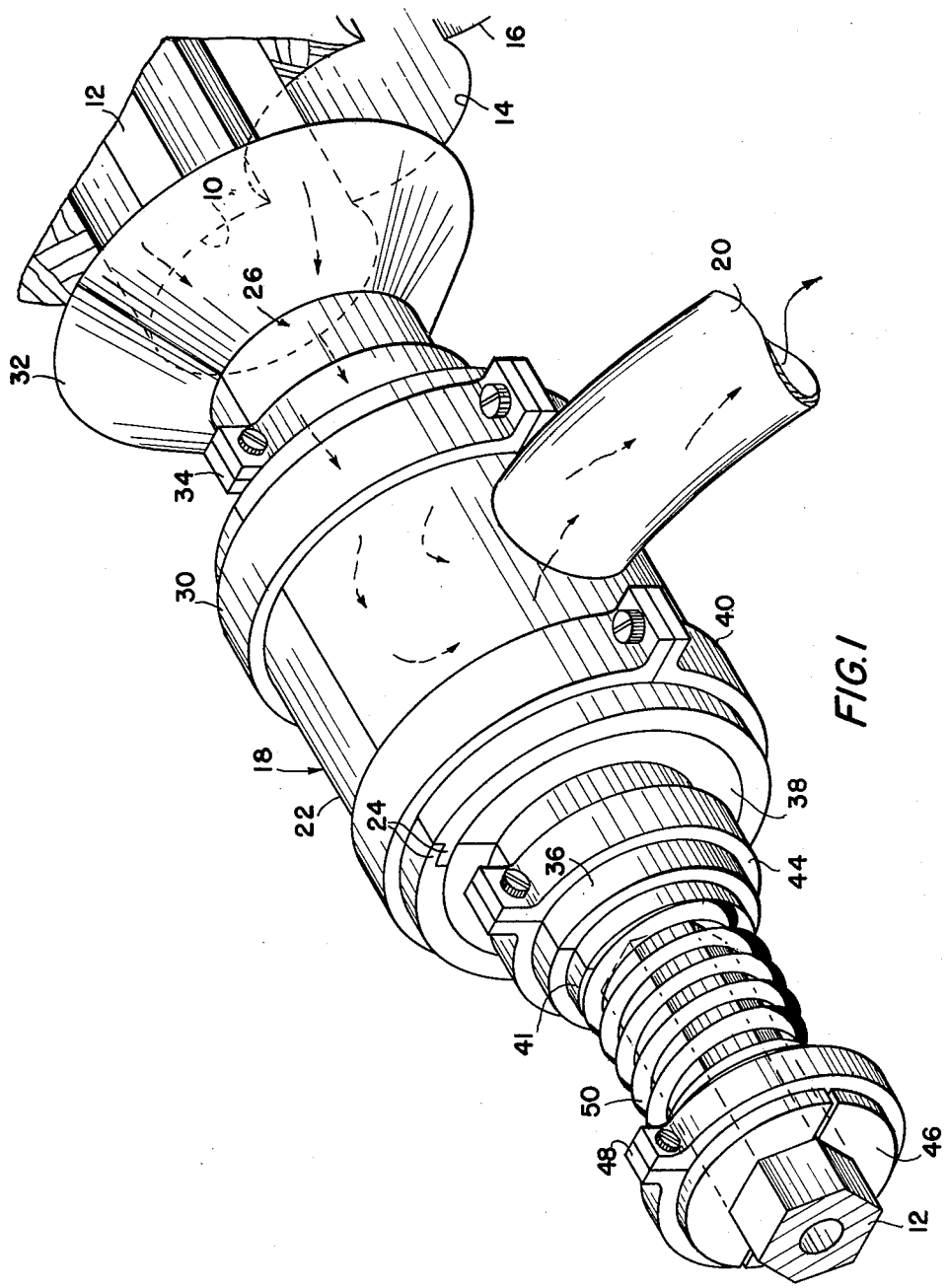

INVENTORS
CARL R. HORTEN
ISIDOR R. LOSS
BY
*Arthur Frederick*
THEIR ATTORNEY

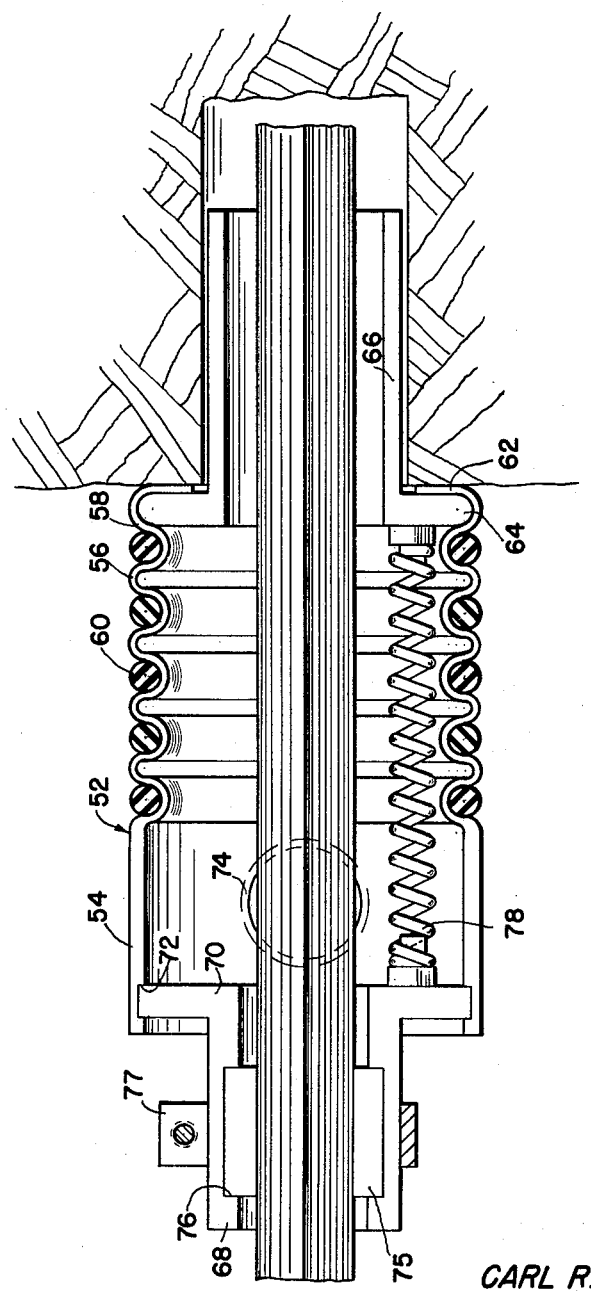

United States Patent Office 3,165,158
Patented Jan. 12, 1965

3,165,158
DRILL CUTTING COLLECTING APPARATUS
Carl R. Horten, Warren Township, Somerset County, and Isidor R. Loss, Phillipsburg, N.J., assignors to Ingersoll-Rand Company, New York, N.Y., a corporation of New Jersey
Filed Aug. 8, 1961, Ser. No. 130,067
4 Claims. (Cl. 175—211)

This invention relates to dust collectors and particularly to dust collectors for rock drills.

As dust collectors have been used heretofore, in any but down-hole drilling, it has always been a problem to mount the dust collector without a support separate and independent of the drill. This is especially true in horizontal drilling where the hood tends to work back away from the rock face, and it is most important that the hood be held against the face to ensure proper dust collecting.

It is an object of this invention to provide a method of mounting a dust collector on a drill steel which will automatically hug the face of the rock being drilled.

Another object is to provide such a dust collector which is easy to manipulate, and cheap to manufacture.

Other objects of the invention will be in part pointed out and in part obvious hereinafter.

Figure 2:
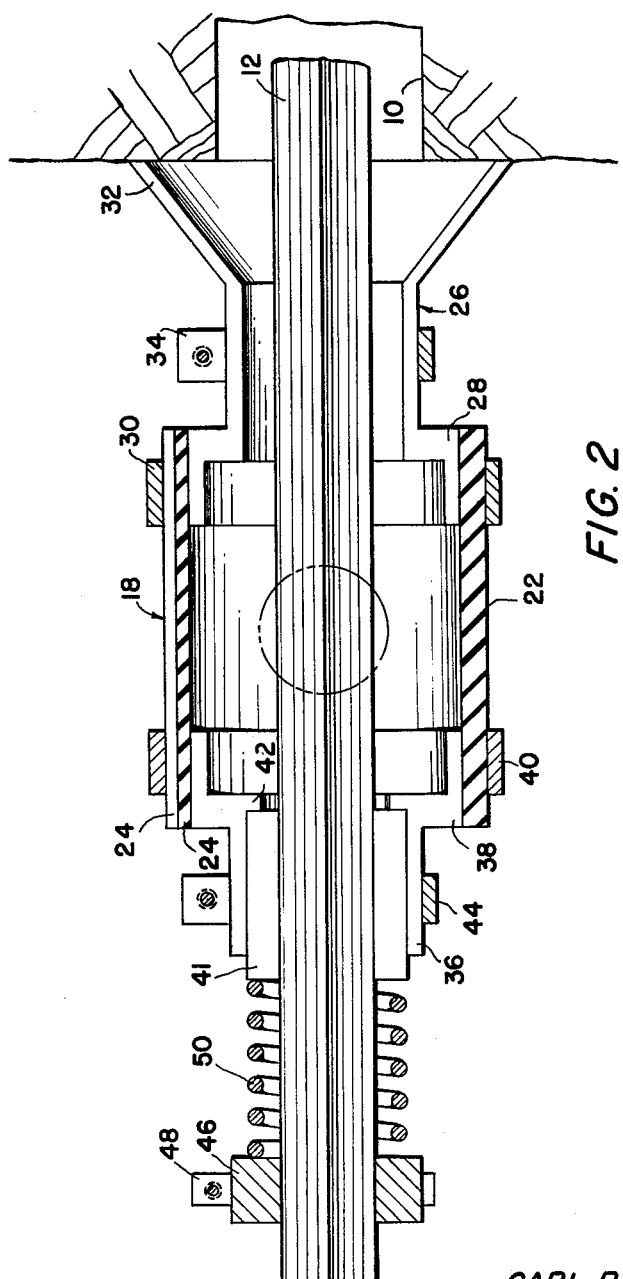

In the drawing,

FIGURE 1 is a perspective external view of a dust collector according to the present invention, FIG. 2 is a longitudinal sectional view of the dust collector shown in FIG. 1, and FIG. 3 is a longitudinal sectional view of a modified form of the invention.

Referring to the drawings and particularly to FIG. 1 and FIG. 2, there is indicated the rock face of formation being drilled at a hole 10. Extending thereinto is a drill steel 12, in this instance hexagonal. Hole 10 is one of a series of overlapping holes 14 and 16 as for instance might occur in line hole drilling. In the type of drilling indicated, the cuttings are removed generally by a blast of air into the hole 10 which blows the cuttings out in the form of pebbles and dust. It is intended these cuttings be collected by a dust collector 18 and discharged through a pipe 20 to a suitable filter and vacuum producing equipment (not shown).

In this instance dust collector 18 comprises a hollow housing member 22 defining a chamber of relatively large size. The housing member 22 may be a longitudinally split cylindrical rubber piece having overlapping ends 24. At the end adapted to lie next to the rock face, is provided a nozzle member 26 flanged, as at 28, to the inner diameter of housing 22 and secured therein by a band or clamp 30. Clamp 30 as shown may be in the form of a split ring having flanged ends secured together by bolts or may be like a conventional hose clamp. At the outer end, in this instance nozzle member 26 is funnel-shaped as at 32 to overlie the drill hole 10. Nozzle member 26 may be split and the two pieces held together by a suitable band clamp 34.

At the opposite end of housing 22 is provided an end wall 36 having a flange 38 fitting within the housing 22 and clamped in position by the clamp 40 similar to band 30. Internally, end wall 36 is provided with a sleeve 41 rotatably mounted and abutting a shoulder 42 to prevent the sleeve from sliding into the interior of housing 22. Sleeve 41 is provided with an interior surface conforming to the external configuration of drill steel 12 which extends through sleeve 41, housing 22, nozzle member 26 and into hole 10. End wall 36 and sleeve 41 may each be constructed of two pieces clamped together by a clamp 44.

In the operation of a percussive type of drill, such as is indicated, the drill steel 12 bounces or reciprocates longitudinally quite violently and dust collector 18 is apt to vibrate with it so that it is desirable to provide means to keep the funnel end 32 up against the rock face. To this end, the invention provides a member which frictionally grips the drill steel so that it will not be moved relative to the steel by such vibrations. In addition, spring means is provided to press against the dust collector 18, using the gripping member as an abutment to hold funnel end 32 in place.

In this instance there is provided a collar 46 which may be constructed of any suitable material which is held frictionally on steel 12 by a clamp 48. The amount of frictional engagement between collar 46 and drill steel 12 may be adjusted by adjustment of clamp 48. Collar 46 is spaced from the end of collector 18 and acts as an abutment for a coil spring 50. Encircling steel 12 spring 50 is adapted to bear against rotatable sleeve 41 and thus to press the dust collector in the direction of the rock face.

As drilling proceeds drill steel 12 advances into the hole which compresses spring 50 which as indicated is a desirable result. When compression of spring 50 produces a force sufficient to overcome the frictional engagement between collar 46 and drill steel 12, the collar 46 is pushed backwardly along steel 12. This cooperative relationship of collar 46 spring 50 and drill steel 12 automatically keeps the dust collector 18 properly held against the rock face.

An alternative arrangement is shown in FIG. 3 in which dust collector 52 is provided with a generally cylindrical housing member 54 having a bellows-like portion 56 with peripheral corrugations sufficiently limber to make housing 54 extensible in longitudinal direction. Housing 54 may be constructed in two parts and held together by circular rubber bands 60 lying between corrugations 58. Inside the lapped over end 62 of housing 54 is the flange 64 of a front nozzle 66 which in this instance is cylindrical and adapted to slide into the drill hole. The rear end of the housing 54 is provided with an end wall 68 having a bore 71 and a flange 70 fitting in a groove 72 provided in the inner peripheral surface of member 54. At a suitable point in the periphery, housing 54 is provided with an opening 74 to receive a discharge hose (not shown).

In this instance the member for frictionally engaging drill steel 12 is a bushing 75 rotatably disposed in groove 76 formed in the surface of bore 71 of end wall 68. Bushing 75 may also be of two piece construction and sufficiently flexible so as to be compressible by a suitable clamp 77 into frictional engagement with steel 12. In this instance bushing 75 serves the same purpose as collar 46 of the other embodiment. The resiliency necessary to maintain nozzle 66 in the drill hole is provided by a suitable spring 78 which has the tendency to extend housing 54 so that nozzle 66 will be pushed completely into the drill hole. As the drill steel 12 pushes the end of the housing 54 toward the rock face, through the frictional engagement of the drill steel and bushing 75, the pressure of spring 78 when sufficient to overcome the frictional engagement between the drill steel and bushing slides bushing 75 back along drill 12 thereby preventing excessive compression of housing 54.

Thus are accomplished, among others, the objects hereinbefore referred to.

We claim:

1. A dust collector to fit about a drill steel at a drill hole comprising a hollow housing adapted to encircle the drill steel and having a discharge passage, said housing being extensible, a nozzle on said housing to communicate with the drill hole, a member frictionally gripping said drill steel, said member being fitted to rotate in the rearward end of the housing, and spring means disposed within said housing and connected between said nozzle and said member to maintain said nozzle at the drill hole as the drill steel advances into the hole.

2. A dust collector as set forth in claim 1 in which the nozzle is cylindrical in shape and fits into the drilled hole.

3. A dust collector as set forth in claim 1 in which the member is fitted to rotate in the rearward end of the housing and said housing is corrugated to permit lengthening and shortening thereof.

4. A dust collector to fit about a drill steel at a drill hole comprising a hollow housing adapted to encircle the drill steel and having a discharge passage, said housing having peripheral corrugations to permit lengthening and shortening of the housing, a nozzle on said housing adapted to enter the drill hole, an adjustable member adapted to frictionally engage said drill steel, and a spring within said housing and cooperating with said member and said nozzle to maintain said nozzle within the drill hole.

References Cited by the Examiner
UNITED STATES PATENTS

| | | | |
|---|---|---|---|
| 895,228 | 8/08 | Bartlett | 175—211 |
| 983,986 | 2/11 | Dwyer | 175—209 |
| 1,131,009 | 3/15 | Rylander | 175—209 |
| 1,981,570 | 11/34 | Price | 175—211 |
| 2,279,186 | 4/42 | Terry et al. | 175—209 |
| 2,792,199 | 5/57 | Becker et al. | 175—211 |
| 2,828,108 | 3/58 | Hood et al. | 175—211 |

BENJAMIN HERSH, *Primary Examiner.*

CHARLES E. O'CONNELL, *Examiner.*